(12) United States Patent
Iida

(10) Patent No.: US 6,619,409 B2
(45) Date of Patent: Sep. 16, 2003

(54) VIBRATION-ISOLATING MEMBER AND VIBRATION-ISOLATING DEVICE

(75) Inventor: Giichi Iida, Tokyo (JP)

(73) Assignee: Kioritz Corp., Tokyo (JP)

( * ) Notice: Subject to any disclaimer, the term of this patent is extended or adjusted under 35 U.S.C. 154(b) by 0 days.

(21) Appl. No.: 09/915,478

(22) Filed: Jul. 27, 2001

(65) Prior Publication Data

US 2002/0011343 A1 Jan. 31, 2002

(30) Foreign Application Priority Data

Jul. 31, 2000 (JP) ........................... 2000-230489

(51) Int. Cl.[7] .................. B25D 17/11; B25D 17/24; B25D 17/04; B27B 15/00; B23D 57/02
(52) U.S. Cl. ................. 173/162.2; 173/162.1; 30/381; 30/384
(58) Field of Search ............ 173/162.2, 162.1, 173/211; 30/381, 382, 383, 384, 385

(56) References Cited

U.S. PATENT DOCUMENTS

| | | | | |
|---|---|---|---|---|
| 4,198,752 A | * | 4/1980 | Bross | 30/381 |
| 4,202,096 A | * | 5/1980 | Nagashima | 30/381 |
| 4,522,378 A | * | 6/1985 | Nelson | 267/153 |
| 5,046,566 A | | 9/1991 | Dorner et al. | |
| 5,699,865 A | * | 12/1997 | Forderer et al. | 173/162.2 |
| 6,220,367 B1 | * | 4/2001 | Masterson et al. | 173/162.2 |
| 6,412,180 B1 | * | 7/2002 | Wolf et al. | 173/162.2 |

FOREIGN PATENT DOCUMENTS

| | | | | |
|---|---|---|---|---|
| JP | | 61-21627 | 6/1986 | |
| WO | WO 94/16864 A1 | * | 8/1994 | B25B/17/24 |

* cited by examiner

*Primary Examiner*—Anthony D. Stashick
(74) *Attorney, Agent, or Firm*—Michael D. Bednarek; Shaw Pittman LLP

(57) ABSTRACT

A vibration-isolating member is formed of an elastic material, and has a mounting hole at the center thereof, a large diameter section at an end of the mounting hole, a groove at the periphery of the large diameter section, and a flange. One of a vibration-source-side member and a vibration-receiving member is fitted into each of the large diameter section and the groove. An end opposite from the large diameter section is secured to one of the vibration-receiving member and the vibration-source-side member by a mounting member. Since the inside diameter of the large diameter section is larger than any other part of the mounting hole, either of the vibration-source-side member or the vibration-receiving member and the mounting member can be received. The flange prevents the vibration-isolating member from disengaging from one of the vibration-source-side member and the vibration-receiving member.

6 Claims, 4 Drawing Sheets

VIBRATION-ISOLATING MEMBER AND VIBRATION-ISOLATING DEVICE

BACKGROUND OF THE INVENTION

1. Field of the Invention

The present invention relates to a vibration-isolating member and a vibration-isolating device for damping the vibration which is generated from a portable power tool such as a power blower, a chain saw, and a bush cutter, and which is transmitted to a worker.

2. Description of the Related Art

Various types of vibration isolating devices have been proposed as a device for damping the vibration.

SUMMARY OF THE INVENTION

Accordingly, it is an object of the present invention to provide a new useful vibration-isolating member, a vibration-isolating device, and a portable power tool, in which the number of parts and the cost of manufacturing can be reduced, assembly can be simplified, and vibration-damping efficiency is improved.

In order to achieve the above object, a vibration-isolating member according to the present invention is disposed between a vibration-source-side member and a vibration-receiving member, connects the vibration-source-side member and the vibration-receiving member together in such a manner as to isolate the vibration, and is formed of an elastic material. The vibration-isolating member comprises a mounting hole provided at the center thereof; a large diameter section formed at a first end of the mounting hole, into which one of the vibration-source-side member and the vibration-receiving member is fitted; a groove formed at the outside periphery of the large diameter section, into which one of the vibration-source-side member and the vibration-receiving member is fitted; and a flange formed by forming the groove.

The vibration-isolating member is disposed between the vibration-source-side member and the vibration-receiving member and damps the vibration transmitted from the vibration-source-side member to the vibration-receiving member. The first end of the vibration-isolating member on the large-diameter-section side is mounted on one of the vibration-source-side member and the vibration-receiving member using the large diameter section and the groove. In other words, for example, the vibration-source-side member on which the first end of the vibration-isolating member is mounted is formed in the shape which can be fitted in the large diameter section and the groove. Accordingly, the wall between the large diameter section and the groove can be sandwiched by the vibration-source-side member. Also, the flange formed at the first end of the vibration-isolating member by forming the groove reliably prevents the vibration-isolating member from being disengaged therefrom and secures it. Therefore, there is no need for special parts in order to secure the first end of the vibration-isolating member to one of the vibration-source-side member and the vibration-receiving member.

On the other hand, a second end of the vibration-isolating member, which is opposite to the large diameter section, is secured to one of the vibration-receiving member and the vibration-source-side member by a mounting member inserted from the large diameter section into the mounting hole.

In the vibration-isolating member, the vibration-isolating device having the vibration-isolating member, and the portable power tool according to the present invention, the first end of the vibration-isolating member can be secured to one of the vibration-source-side member and the vibration-receiving member without special mounting parts. Accordingly, the number of parts and the cost of manufacturing can be reduced, and also, assembly work is simplified. Also, the vibration-isolating member is secured while maintaining the elasticity effectively, so that a high vibration damping effect can be obtained.

DESCRIPTION OF THE PREFERRED EMBODIMENTS

Figure 1:
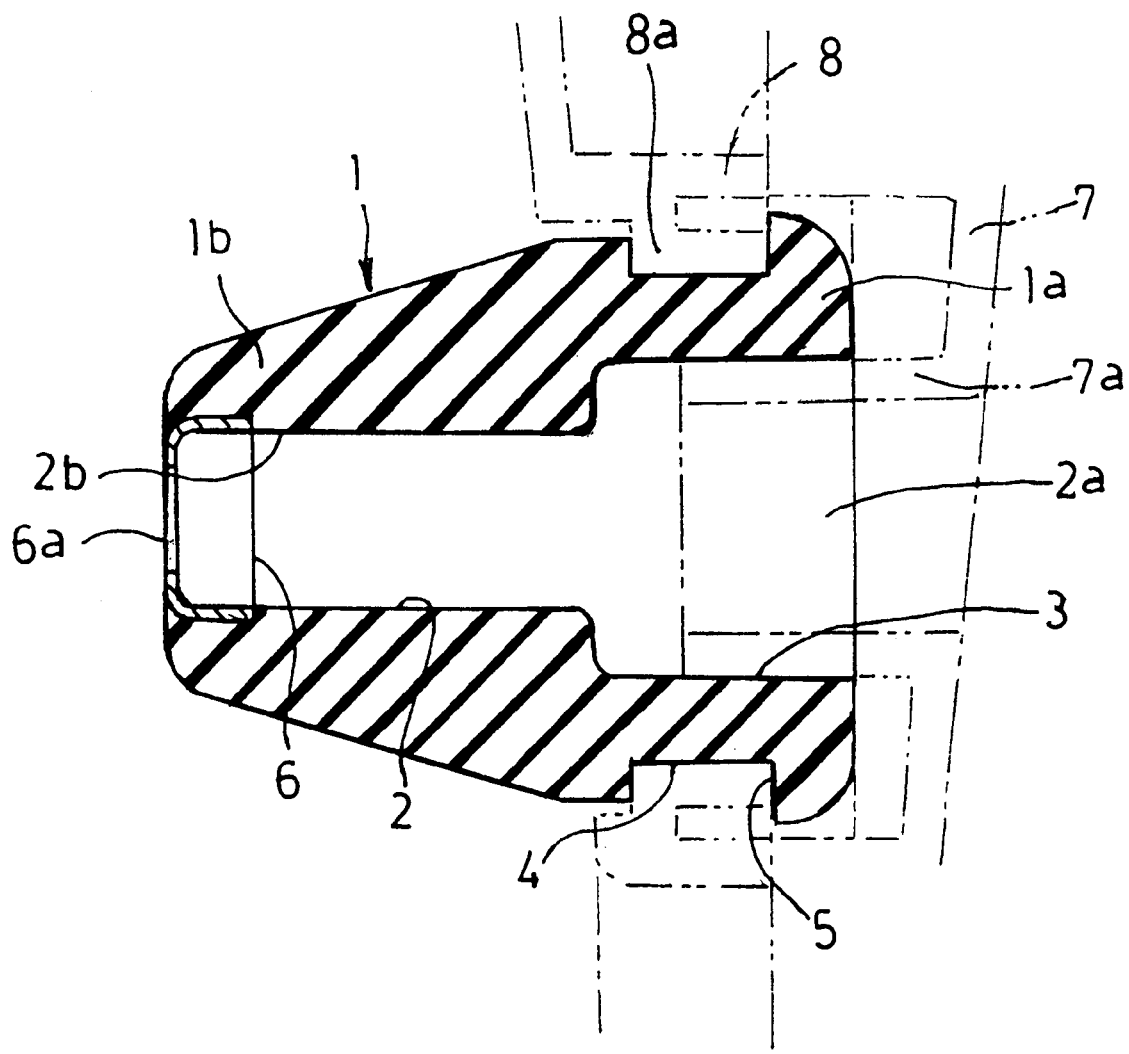
FIG. 1 is a cross sectional view of a vibration-isolating member according to an embodiment of the present invention.

A vibration-isolating member 1 according to an embodiment of the present invention is formed of an elastic material having appropriate elasticity, such as rubber, is cylindrically shaped, and has a round mounting hole 2 in the cross section formed at the center thereof. The mounting hole 2 extends along the axis of the vibration-isolating member 1 from a first end 1a to a second end 1b thereof. The entire external appearance of the vibration-isolating member 1 is shaped like a truncated cone.

The mounting hole 2 has a large diameter section 3 formed at a first end 2a thereof, the large diameter section 3 having a larger inside diameter than any other part thereof. Also, a groove 4 extending along the outside periphery of the large diameter section 3 is formed in the outside periphery thereof.

In FIG. 1, reference numeral 5 denotes a flange formed at the first end 1a of the vibration-isolating member 1, that is, a side end of the large diameter section 3, by forming the groove 4. Reference numeral 6 indicates a cup-shaped washer baked on the bottom of the mounting hole 2 at the second end 2b which is opposite the first end 2a thereof. A through hole 6a into which a bolt 9 as a mounting member, which will be described later, is inserted is formed at the center thereof.

In the vibration-isolating member 1, a cylindrical section 7a of a vibration-source-side member 7 is inserted and fitted into the large diameter section 3 and, for example, a through-hole-formed section 8a of a vibration-source-side member 8 is engaged in the groove 4. Accordingly, a portion between the large diameter portion 3 and the groove 4 is sandwiched by the cylindrical section 7a and the through-hole-formed section 8a. Also, the flange 5 reliably prevents the vibration-isolating member 1 from being disengaged from the vibration-source-side members 7 and 8 and secures it thereto.

Also, the vibration-source-side members 7 and 8 sandwich the first end 1a of the vibration-isolating member 1 without damaging the elasticity thereof, thereby securing the vibration-isolating member 1 while maintaining the elasticity effectively. Accordingly, a high vibration damping effect can be obtained.

Figure 2:
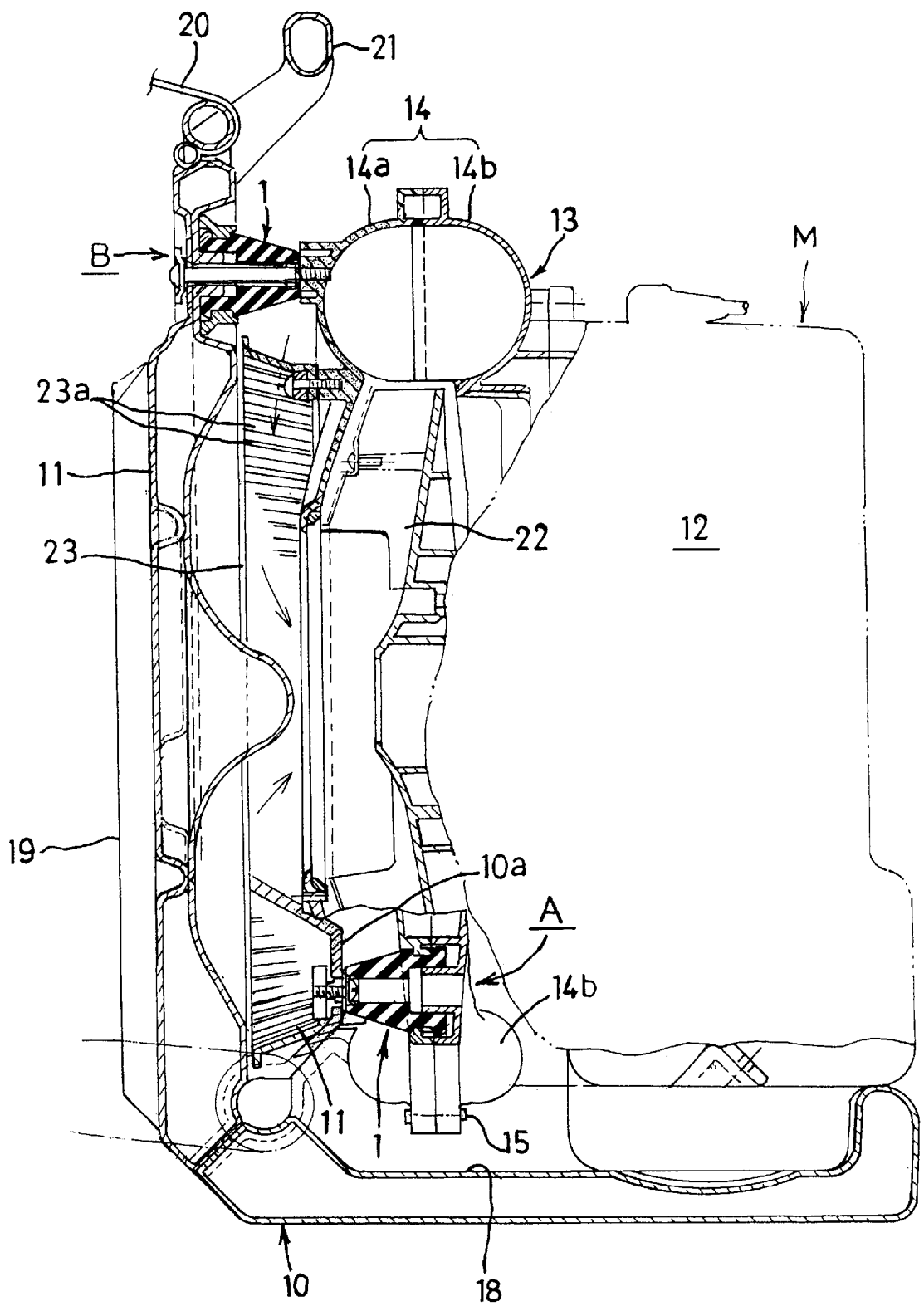
FIG. 2 is a cross sectional view of essential parts of a vibration-isolating device section in a backpack air-blast power tool using the vibration-isolating member shown in FIG. 1.

FIG. 2 shows a cross sectional view of the essential parts of a backpack air-blast power tool as an example of a portable power tool using the vibration-isolating member 1.

In FIG. 2, a main body M of the power tool includes an internal combustion engine 12 as a prime mover that is a vibration generation source, such as an air-cooled two-cycle gasoline engine, and a centrifugal fan 13 as a working member driven by the internal combustion engine 12. The main body M has a fuel tank, various control levers, and the like (not shown) assembled therein. The main body M is connected to a carrying frame 10 carried by a worker, which contacts the human body, via the vibration-isolating members 1 in such a manner as to isolate the vibration.

Reference numeral 18 denotes the bottom of the carrying frame 10, reference numeral 19 denotes a back and waist cushion, reference numeral 20 denotes a carrying band, reference numeral 21 denotes a portable grip, reference numeral 22 denotes an air blower driven by the internal combustion engine 12, and reference numeral 23 denotes an intake grid having a large number of intake ports 23a.

In the backpack air-blast power tool, a vibration-isolating device using the vibration-isolating member 1 is interposed, for example, between the carrying frame 10 serving as a vibration-receiving member 11, and the main body M serving as the vibration-source-side members 7 and 8. Specifically, each vibration-isolating member 1 is interposed between the carrying frame 10 and a volute case 14 of the centrifugal fan 13 forming the main body M. Mounting sections are denoted by sections A and B in FIG. 2.

The volute case 14 is divided transversely from front to rear, that is, into a front-half section 14a and a rear-half section 14b, for convenience in manufacturing. They are connected together with bolts and nuts 15 at an appropriate number of portions around them.

Figure 3:
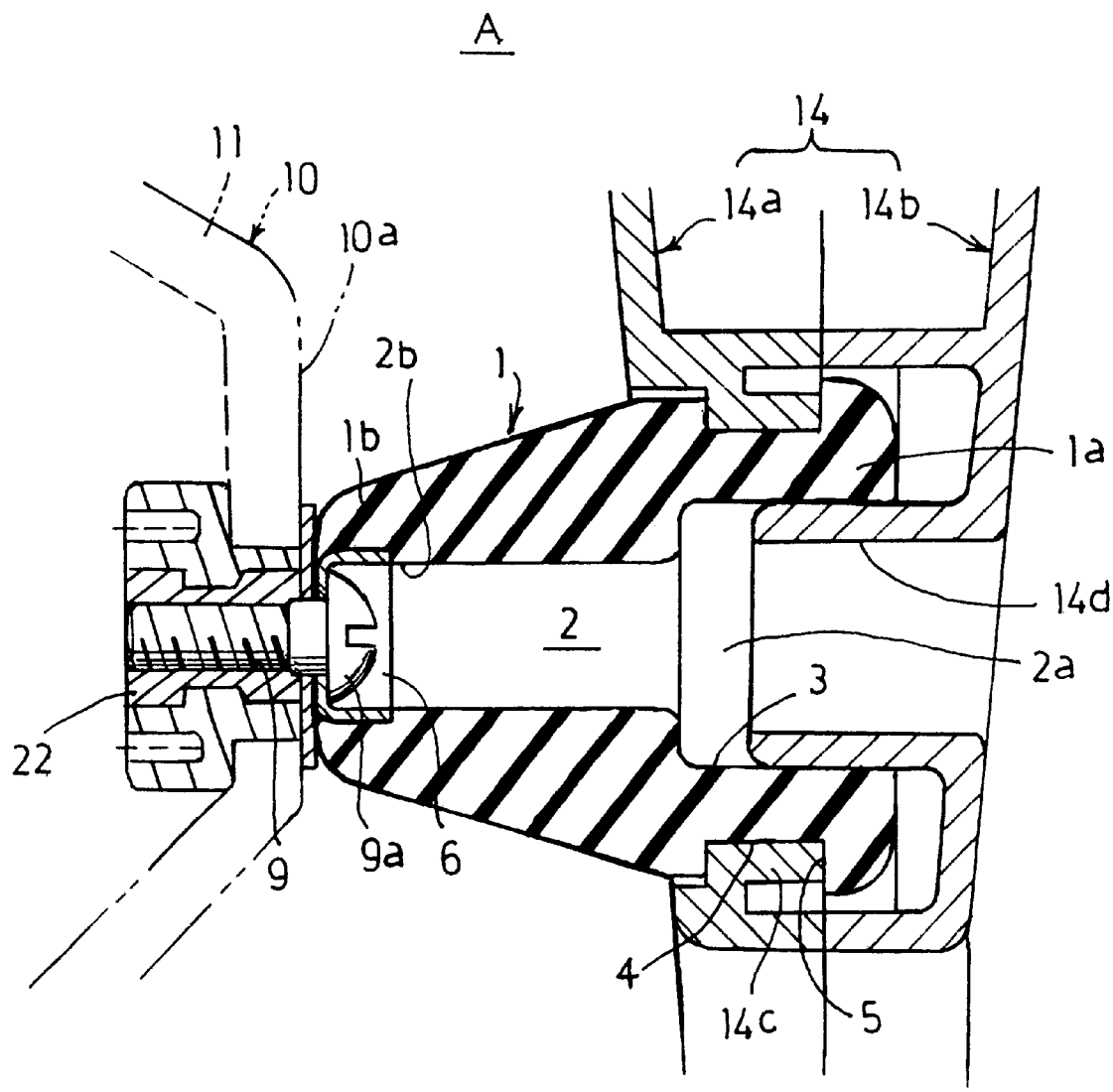
FIG. 3 is an enlarged cross sectional view of section A shown in FIG. 2.

Referring to FIG. 3, sections A which are lower mounting sections will be described. In each of sections A disposed at the lower right and left portions, a through-hole-formed section 14c formed at the front-half section 14a of the volute case 14 forming the centrifugal fan 13 is fitted in the groove 4 formed at the first end 1a of the vibration-isolating member 1, as the vibration-source-side member 8. A cylindrical section 14d formed at the rear-half section 14b of the volute case 14 forming the centrifugal fan 13 is fitted in the large diameter section 3 formed at the first end 2a of the mounting hole 2 of the vibration-isolating member 1, as the vibration-source-side member 7. The front-half section 14a and the rear-half section 14b of the volute case 14 are connected together with the bolts and nuts 15, as shown in FIG. 2.

In each section A, the wall between the groove 4 at the first end 1a of the vibration-isolating member 1 and the large diameter section 3 is sandwiched by the through-hole-formed section 14c of the front-half section 14a and the cylindrical section 14d of the rear-half section 14b, and disengaging thereof is surely prevented when the volute case 14 is assembled. Accordingly, there is no need for special parts in order to secure the first end 1a of the vibration-isolating member 1.

The second end 1b of the vibration-isolating member 1 is secured to a projection 10a formed at the back of the carrying frame 10 with the bolt 9 inserted from the large diameter section 3. A head 9a of the bolt 9 screwed into a stepped stopper nut member 22 through the washer 6 presses the washer 6 secured to the vibration-isolating member 1 against the projection 1a.

Since the inside diameter of the large diameter section 3 is larger than that of the other part of the mounting hole 2, the bolt 9 can be inserted into the mounting hole 2 through the cylindrical section 14d of the rear-half section 14d of the volute case 14 even after receiving the cylindrical section 14d.

Figure 4:
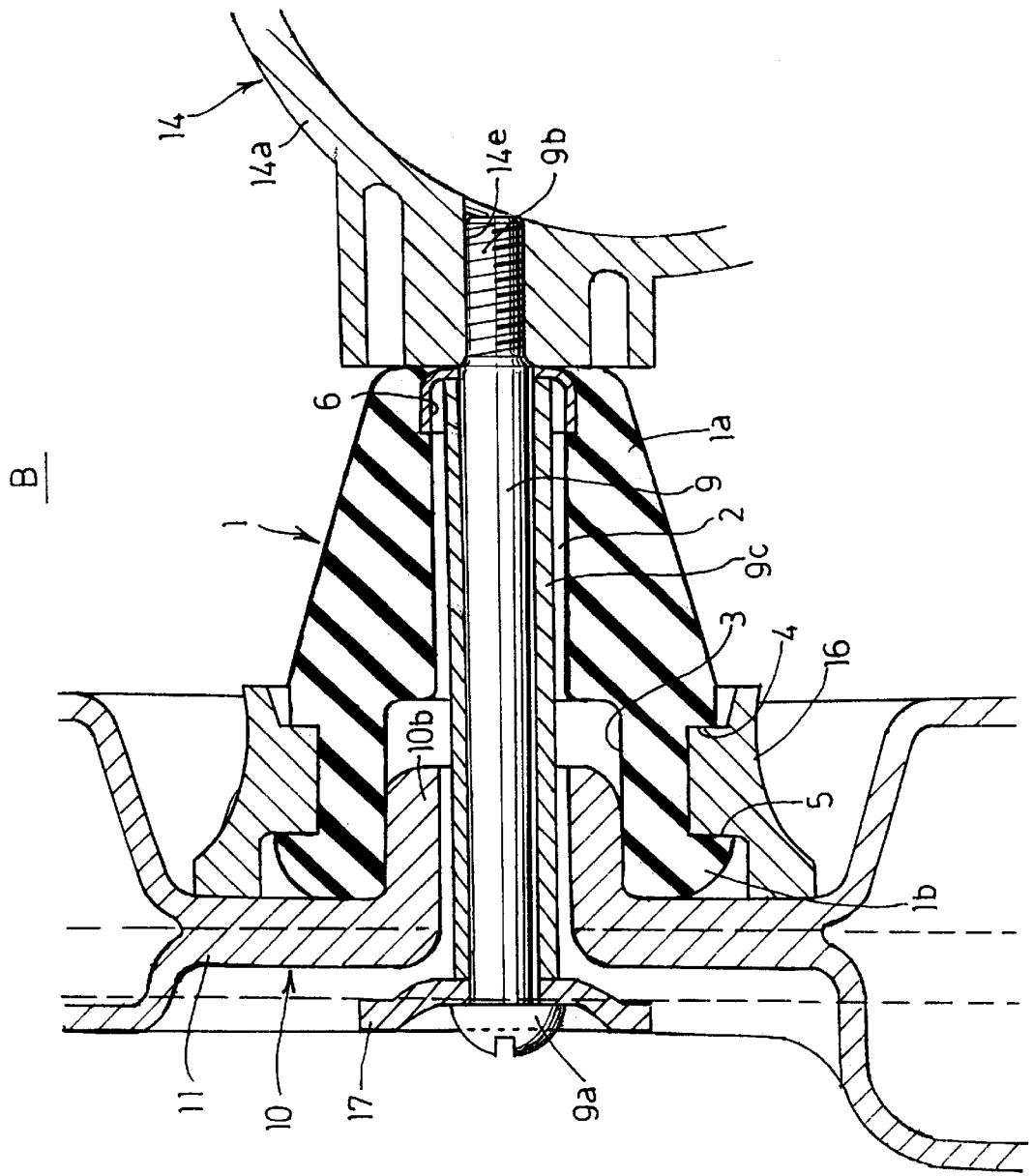
FIG. 4 is an enlarged cross sectional view of section B shown in FIG. 2.

Referring to FIG. 4, section B which is an upper mounting section will be described hereinbelow. In section B which is disposed centrally at one upper position of the device, the vibration-isolating member 1 which is the same as that used in section A is disposed between the volute case 14 and the carrying frame 10 in reverse orientation to section A. In section B, elements similar to those in section A are indicated by the same reference numerals.

In section B, the difference from sections A is that a cylindrical section 10b formed on the carrying frame 10 is fitted in the large diameter section 3 of the vibration-isolating member 1 as the vibration-receiving member 11, and a ring-shaped retaining member 16 formed on the carrying frame 10 is fitted in the groove 4 of the vibration-isolating member 1. Another difference is that the bolt 9 serving as a mounting member passes through the carrying frame 10 together with a cylinder 9c, with the head 9a passing through a dish shaped stopper washer 17, and a male screw 9b at the end thereof is screwed into a female screw hole 14e formed in the front-half section 14a of the volute case 14, and as a result, even when the vibration-isolating member 1 is broken, the main body M is not disengaged.

Since the inside diameter of the large diameter section 3 is larger than that of any other portion of the mounting hole 2, both the cylindrical section 10b of the carrying frame 10 and the bold 9 can be received.

What is claimed is:

1. A vibration-isolating member which is interposed between a vibration-source-side member and a vibration-receiving member, connects the vibration-source-side member and the vibration-receiving member together in such a manner as to isolate vibrations, and is formed of an elastic material, said vibration-isolating member comprising:

a mounting hole provided at the center thereof;

a large diameter section, formed at a first end of the mounting hole, into which one of the vibration-source-side member and the vibration-receiving member is fitted;

a groove, formed at the outside periphery of the large diameter section, into which the one of the vibration-source-side member and the vibration-receiving member is fitted; and a flange formed by forming the groove.

2. A vibration-isolating device in which a vibration-isolating member is interposed between a vibration-source-side member and a vibration-receiving member, and are connected together in such a manner as to isolate vibrations, the vibration-isolating member being formed of an elastic material, said vibration-isolating device comprising:

a mounting hole provided at the center thereof;

a large diameter section formed at a first end of the mounting hole;

a grove formed at the outside periphery of the large diameter section; and a flange formed by forming the groove;

wherein, one of the vibration-source-side member and the vibration-receiving member is fitted into the large diameter section and the groove of the vibration-isolating member; and wherein, an end which is opposite the large diameter section of the vibration-isolating member is secured to the other one of the vibration-receiving member and the vibration-source-side member by a mounting member inserted from the large diameter section into the mounting hole.

3. A portable power tool comprising:
a vibration-source-side member connected to a prime mover for driving a working member;
a vibration-receiving member connected to a human-body contact section; and
a vibration-isolating member interposed between the vibration-source-side member and the vibration-receiving member,
wherein, the vibration-source-side member and the vibration-receiving member are connected together by the vibration-isolating member in such a manner as to isolate vibrations;
wherein the vibration-isolating member being formed of an elastic material, and comprises:
a mounting hole provided at the center thereof;
a large diameter section formed at a first end of the mounting hole;
a groove formed in the outside periphery of the large diameter section; and
a flange formed by forming the groove,
wherein, one of the vibration-source-side member and the vibration-receiving member is fitted into the large diameter section and the groove of the vibration-isolating member; and
wherein, an end which is opposite the large diameter section of the vibration-isolating member is secured to the other one of the vibration-receiving member and the vibration-source-side member by a mounting member inserted from the large diameter section into the mounting hole.

4. The vibration-isolating member of claim 1, wherein sections fitted into the groove and the large diameter section of the vibration-isolating member form one of the vibration-source-side member and the vibration-receiving member as an assembly.

5. The vibration-isolating member of claim 2, wherein sections fitted into the groove and the large diameter section of the vibration-isolating member form one of the vibration-source-side member and the vibration-receiving member as an assembly.

6. The vibration-isolating member of claim 3, wherein sections fitted into the groove and the large diameter section of the vibration-isolating member form one of the vibration-source-side member and the vibration-receiving member as an assembly.

* * * * *